US006993304B2

United States Patent
Fujiki et al.

(10) Patent No.: US 6,993,304 B2
(45) Date of Patent: Jan. 31, 2006

(54) SIGNAL-INPUT STATUS DISPLAY DEVICE FOR MULTI-BAND RECEIVER

(75) Inventors: Shiro Fujiki, Yokohama (JP); Soichiro Kawasaki, Hachioji (JP)

(73) Assignee: Vertex Standard Co., Ltd., (JP)

( * ) Notice: Subject to any disclaimer, the term of this patent is extended or adjusted under 35 U.S.C. 154(b) by 533 days.

(21) Appl. No.: 10/379,283

(22) Filed: Mar. 4, 2003

(65) Prior Publication Data

US 2004/0204139 A1 Oct. 14, 2004

(30) Foreign Application Priority Data

Mar. 5, 2002 (JP) .............................. 2002-059319

(51) Int. Cl.
*H04B 1/18* (2006.01)
(52) U.S. Cl. .............................. 455/159.2; 455/159.1; 455/154.1; 455/168.1
(58) Field of Classification Search ............. 455/159.1, 455/159.2, 168.1, 154.1, 158.1, 158.5, 566, 455/115.1, 115.4
See application file for complete search history.

(56) References Cited

U.S. PATENT DOCUMENTS 3,987,401 A * 10/1976 Irving ..................... 455/159.2
4,468,814 A * 8/1984 Field ....................... 455/159.2
6,438,390 B1 * 8/2002 Awan ........................ 455/566
2002/0128006 A1 * 9/2002 Martine et al. ............. 455/423

* cited by examiner

Primary Examiner—Nick Corsaro
Assistant Examiner—Raymond B. Persino
(74) Attorney, Agent, or Firm—Fulwider Patton, LLP (57) ABSTRACT

An MCU 30 of a multi-band receiver detects signal input levels from level detection circuits 18 and 18' of receiver circuits 4a and 4b, respectively, and thereby determines and identifies to which frequency band a signal input has been performed or whether simultaneous signal inputs to frequency bands have been performed.

The MCU 30 controls over drive circuits for LEDs 41g and 41r according to the signal input statuses, thereby causing a multi-colored light-emitting indicator 41 to illuminate in different colors.

Further, in a single signal input, the illumination color of the multi-colored light-emitting indicator 41 can be changed within an identical color group according to the level of a received frequency, for display. Further, when the received frequency is the frequency stored in a memory channel, the illumination color can be made to be different from the colors emitted in the single signal input status.

3 Claims, 7 Drawing Sheets

Prior art

SIGNAL-INPUT STATUS DISPLAY DEVICE FOR MULTI-BAND RECEIVER

BACKGROUND OF THE INVENTION

1. Field of the Invention

The present invention belongs to a technical field for wireless communication, and relates to a configuration for simplifying an indicator section and improving a function of displaying various signal input statuses in a multi-band receiver, by displaying the signal input statuses using a multi-colored light-emitting indicator.

2. Description of the Related Art

In radio receivers, in order to visually notifying an operator of the input of a received signal, a method of turning on an indicator on an operation panel has been often adopted, hitherto. The indicator is generally referred to as a BUSY lamp.

In multi-band receivers of a type that can receive a plurality of radio waves simultaneously, in particular, in order to indicate to which frequency band a signal has been input, indicators are provided for respective frequency bands. Then, an indicator associated with the frequency band from which a signal input has been detected is automatically turned on.

Figure 8:
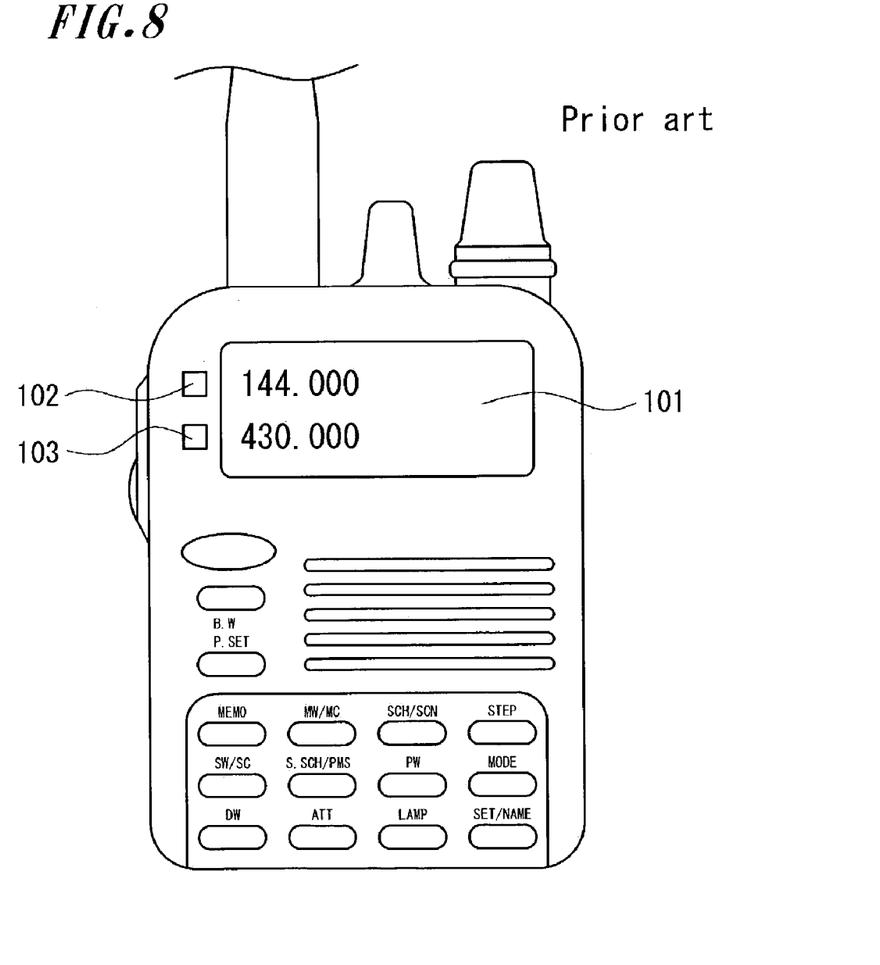
FIG. 8 shows a front view of a handheld transceiver that includes a conventional multi-band receiver.

FIG. 8, for example, shows a handheld transceiver that covers a 144 MHz frequency band from 144 to 146 MHz and a 430 MHz frequency band from 430 to 440 MHz, both of which are employed by a lot of amateur radio stations. Character displays of the frequency bands are provided on a liquid crystal display section 101. In addition, indicators 102 and 103, which are mono-color LEDs, are provided at locations adjacent to the liquid crystal display section 101, which correspond to the locations where the character displays are provided.

Then, when a scan mode for the frequency of a signal input is set, a built-in PLL synthesizer or the like is operated to sweep through respective frequency bands. If the signal input has been detected, an indicator for the frequency band including the received frequency is turned on.

Accordingly, each of the indicators for the handheld transceiver is driven individually; if the signal input has been detected in the 144 MHz band, the indicator 102 is turned on. If the signal input has been detected in the 430 MHz band, the indicator 103 is turned on. If signal inputs have been detected in both of the frequency bands, both of the indicators 102 and 103 are turned on. The operator can thereby see the input status of a received signal from the illumination state of each of the indicators 102 and 103.

In the configuration described above, however, there is naturally a need to provide indicators corresponding to the number of frequency bands.

Further, as illustrated in FIG. 8, it is necessary for the indicators 102 and 103 to be provided adjacent to the liquid crystal display section 101, in view of correspondence to the character displays of the frequency bands.

For these reasons, in the handheld transceiver for which miniaturization is demanded, finding room for indicators sometimes becomes difficult. Moreover, in view of a design as well, it is not also so desirable for the liquid crystal display section to be located off the center of the front surface of the housing of the transceiver.

Further, in the transceiver in FIG. 8, there assumed to be two frequency bands for reception. However, if other frequency bands are also available for reception, the size of the liquid crystal display section is limited, so that small indicators should be aligned. Thus, in addition to the problems described above, there also arises the problem that display of the indicators is so small that it is difficult to check.

Still further, the number of wiring works for drive circuits for the respective indicators increases, so that very fine and complicated works become necessary.

On the other hand, recently, there is developed an indicator disclosed in Japanese Patent Unexamined Publication HEI7-15044, where LEDs of two or three colors of RGB (red, green, blue) are mounted on a single substrate. In this indicator, lights emitted from the respective LEDs are optically mixed, thereby enabling multi-colored display.

SUMMARY OF THE INVENTION

The object of the present invention is therefore to apply a multi-colored light-emitting indicator to a multi-band receiver to allow display of and seeing signal input statuses using different colors, thereby solving the problems described above.

A signal input status display device for a multi-band receiver according to the present invention comprises:

an indicator having a plurality of light-emitting diodes (hereinafter referred to as "LEDs") emitting different illumination colors as light source elements, for optically mixing individual lights of the respective LEDs, thereby permitting multi-colored light emission;

signal detection means for detecting from receiving circuits for respective frequency bands signals each indicating the signal-input level of a received wave;

determination and identification means for determining whether a single signal input to one of the frequency bands has been performed or simultaneous signal inputs to a plurality of the frequency bands have been performed, based on the states of the signals each indicating the signal-input level, detected by the signal detection means, and identifying one of the frequency bands to which the single signal input has been performed; and LED control means for performing drive control over the respective LEDs such that the illumination color of the indicator differs according to each of the frequency bands based on information on one of the frequency band to which the single signal input has been performed if the determination and identification means has determined the single signal input has been performed, or such that the illumination color of the indicator is different from the colors in the status of the single signal input if the determination and identification means has determined the simultaneous signal inputs have been performed.

In the present invention, the determination and identification means determines whether a single signal input has been performed or simultaneous signal inputs have been performed according to the signals detected from the receiving circuit by the signal detection means. Further, if the single signal input has been performed, the determination and identification means identifies the frequency band to which the single signal input has been performed.

Then, based on information on the determination and the identification, the LED control means performs drive control over the respective LEDs of the indicator. The LED control means causes the indicator to illuminate in a color associated with each of the frequency bands in the single signal input status. On the other hand, in the simultaneous signal input status, the LED control means causes the indicator to illuminate in a color indicating the simultaneous signal input status; the illumination color of the indicator is set to differ depending on each of the statuses.

Accordingly, a single indicator suffices for the multi-band receiver. By looking at the illumination color of the indicator assigned to each of the signal input statuses, the operator can intuitively see a signal input status.

When the multi-band receiver has a multi-channel function for storing a frequency associated with a specific transmitting source, it may be so arranged that comparison means for comparing a received frequency in the single signal input status with the frequency stored by the memory channel function is provided. Then, when the comparison means has detected coincidence between the frequencies, if the LED control means performs drive control over the respective LEDs such that the illumination color of the indicator is different from the colors emitted in the single signal input status and the simultaneous signal input status, it can also be notified clearly that a signal in the single signal input status has been transmitted from the transmission source which is comparatively significant.

In this case, since the multi-colored light-emitting indicator is employed, the illumination color of the indicator can be made to be different for each of the frequency bands within which the received frequency of the signal transmitted from the transmission source falls. With this arrangement, it can be identified within which frequency band the received frequency falls.

Further, assume that determination means is provided which determines within which frequency range a received frequency in the single signal input status falls among a plurality of frequency ranges obtained by division of the respective frequency bands in predetermined steps. Further, assume that the LED control means performs drive control over the respective LEDs such that the illumination color of the indicator is sequentially changed within an identical color group for each of the frequency ranges in ascending or descending order of frequencies. Still further, assume that the indicator is caused to illuminate in a color associated with a frequency range determined by said determination means. With this arrangement, it can be seen at which approximate level in each of the frequency bands the received frequency of the signal input to the multi-band receiver is.

The various features of novelty which characterize the invention are pointed out with particularity in the claims annexed to and forming a part of this specification. For a better understanding of the invention, its operating advantages, and specific objects attained by its use, reference should be had to the accompanying drawing and descriptive matter in which there is illustrated and described a preferred embodiment of the invention.

DETAILED DESCRIPTION OF THE PREFERRED EMBODIMENTS

First Embodiment

Figure 1:
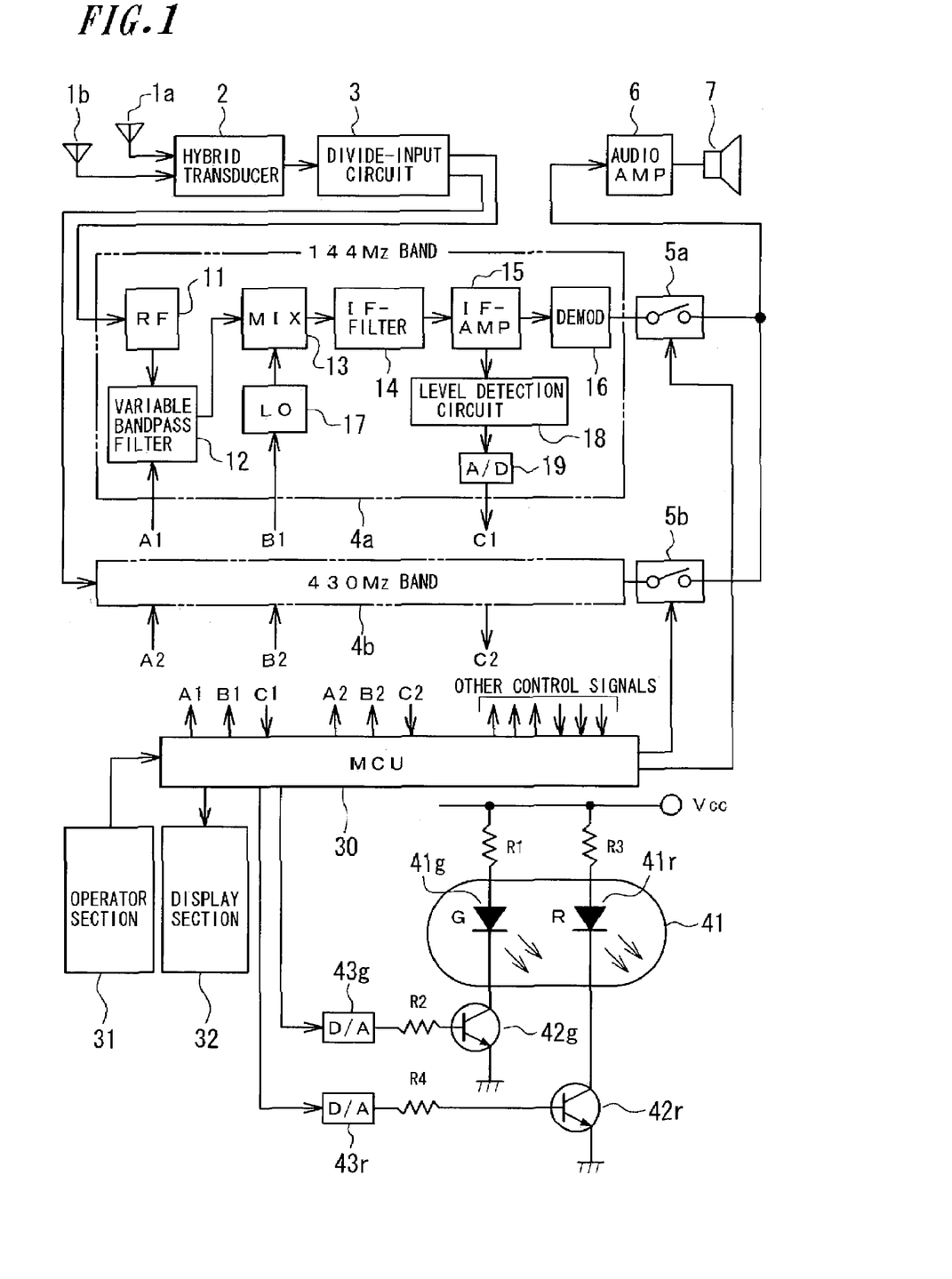
FIG. 1 is a system circuit diagram of a multi-band receiver and drive circuits for an indicator according to a first embodiment of the present invention.

First, FIG. 1 shows a system circuit diagram of a multi-band receiver included in a handheld transceiver and drive circuits for an indicator. Frequency bands for reception for this multi-band receiver are a 144 MHz band and a 430 MHz band.

Referring to FIG. 1, reference numerals 1*a* and 1*b* denote antennas for the 144 MHz band and the 430 MHz band, respectively. Reference numeral 2 denotes a hybrid transducer, reference numeral 3 denotes a divide-input circuit, reference numerals 4*a* and 4*b* denote receiver circuits for the 144 MHz band and the 430 MHz band, respectively, reference numerals 5*a* and 5*b* are output switching circuits for the 144 MHz band and the 430 MHz band, respectively, reference numeral 6 denotes a low-frequency amplifier, and reference numeral 7 denotes a loudspeaker.

The circuit configurations of the receiver circuits 4*a* and 4*b* are the common ones, though they handle different frequency bands. However, in the actual circuit configurations, there are some components shared to each other.

Specifically, each of the receiver circuits 4*a* and 4*b* includes a high-frequency amplifier 11, a variable bandpass filter 12, a frequency mixer 13, an intermediate frequency filter 14, an intermediate frequency amplifier 15, a demodulator 16, a variable local oscillator circuit 17 that uses a PLL synthesizer, for causing the frequency mixer 13 to generate an intermediate frequency, a level detection circuit 18 for detecting the level of a signal received from the intermediate frequency amplifier 15, and an A/D converter 19 for converting the signal the level of which has been detected by the level detection circuit 18 into a digital signal.

In the description given below, the respective components of the receiver circuit 4*a* for the 144 MHz band are assigned reference numerals described above. On the other hand, the respective components of the receiver circuit 4*b* for the 430 MHz band, not shown, are assigned the reference numerals to which marks "'" are added.

The entire system of the multi-band receiver is controlled by a Micro Controller Unit (MCU) 30.

The MCU 30 controls the receiver circuits 4*a* and 4*b* and other circuits based on an input command signal from an operator section 31, and based on an input signal from the receiver circuits 4*a* or 4*b*, the MCU 30 causes the control statuses and the like to be displayed on a liquid crystal display section 32.

The MCU 30 naturally includes a microcomputer circuit constituted by circuit elements of a CPU, a ROM, a RAM, and the like. Various programs for controlling the system are stored in the ROM.

This embodiment is characterized in that the multi-band receiver includes a multi-colored light-emitting indicator 41 and drive circuits for the multi-colored light-emitting indicator 41, and that the MCU 30 causes various signal input statuses to be displayed by using different illumination colors of the multi-colored light-emitting indicator 41.

Figure 2:
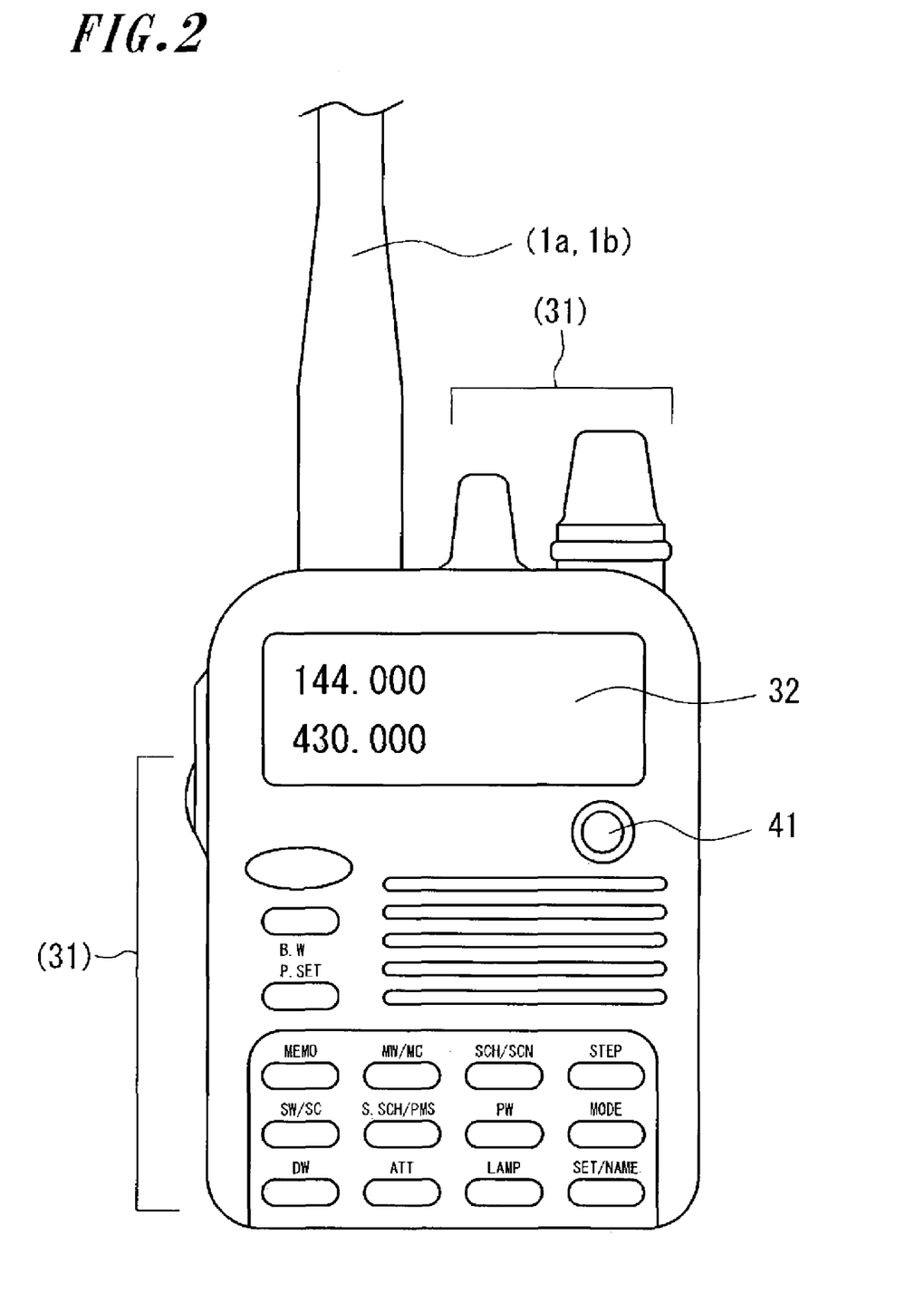
FIG. 2 shows a front view of a handheld transceiver that includes the multi-band receiver therein.

The multi-colored light-emitting indicator 41 has a green LED 41g and a red LED 41r mounted on a single substrate thereof, and causes lights emitted from the LEDs 41g and 41r to be optically mixed, thereby prompting display of a green color, a red color, and a mixture of red and green. As illustrated in FIG. 2, the multi-colored light-emitting indicator 41 is mounted on the lower right side of the liquid crystal display section 32 in the front surface of the housing of the multi-band receiver.

The drive circuits are respectively provided for the LEDs 41g and 41r. Voltages applied to the LEDs 41g and 41r are controlled by NPN transistors 42g and 42r, respectively. The MCU 30 controls the base voltages of the transistors 42g and 42r through D/A converters 43g and 43r, respectively, thereby controlling corrector currents of the transistors 42g and 42r. Incidentally, R1 and R3 indicate operating resistances, while R2 and R4 indicate base input resistances.

Figure 3:
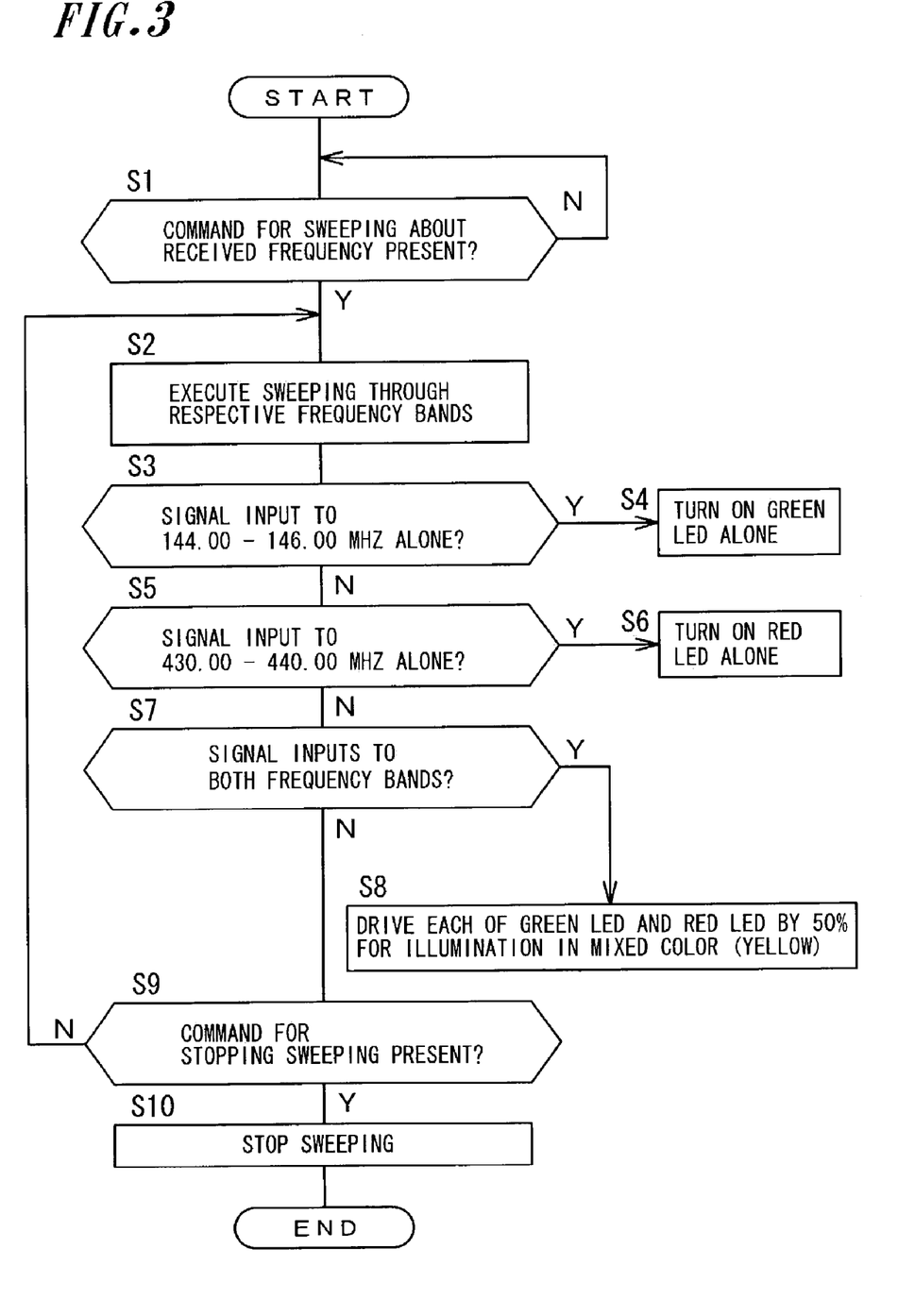
FIG. 3 is a flowchart showing a control procedure for display of a signal input status by a multi-colored light-emitting indicator in the first embodiment.

A control procedure for display of a signal input status using the multi-colored light-emitting indicator 41 of the multi-band receiver is shown in a flowchart in FIG. 3.

First, a description is directed to operations in steps S1 and S2. When a command for performing a sweep with respect to a received frequency is given by a predetermined button operation from the operator section 32, the MCU 30 activates a signal-input status display program in the ROM. Then, the MCU controls the variable bandpass filter 12 and the local oscillator circuit 17 of the receiver circuit 4a by control signals A1 and B1, respectively. The MCU also controls the variable bandpass filter 12' and the local oscillator circuit 17' by control signals A2 and B2, respectively. The MCU thereby executes sweeping through the respective frequency bands.

On the other hand, the level detectors 18 and 18' of the receiver circuits 4a and 4b detect the signal input levels of signals received from the intermediate frequency amplifiers 15 and 15' in a sweeping state, respectively. Signals C1 and C2 indicating the signal input levels are fed to the MCU 30 through the A/D converters 19 and 19', respectively.

Then, if the signal-input level signal indicating a level equal to or more than a predetermined value has been detected in a frequency range from 144.00 to 146.00 MHz alone as a result of the sweep, the MCU 30 causes only the green LED 41g to be driven by 100%, thereby causing the multi-colored light-emitting indicator 41 to be turned on and illuminate green in steps S3 and S4.

On the other hand, if the signal-input level signal indicating the level equal to or more than the predetermined value has been detected in a frequency range from 430.00 to 440.00 MHz alone, the MCU 30 causes only the red LED 43r to be driven by 100%, thereby causing the multi-colored light-emitting indicator 41 to be turned on and illuminate red in steps S5 and S6.

Further, if the signal-input level signals indicating the level equal to or more than the predetermined value have been simultaneously detected in both of the frequency bands described above, the MCU 30 causes the green LED 41g and the red LED 41r to be driven by 50%, respectively, thereby causing the multi-colored light-emitting indicator 41 to be turned on and illuminate yellow, which is a color resulting from mixing of the green light and the red light, in steps S7 and S8.

If no signal-input level signal has been detected in either of the frequency bands, the multi-colored light-emitting indicator 41 is not turned on.

Thereafter, the control procedure for display of the signal input status using the multi-colored light-emitting indicator 41 is repeated for execution until a command for terminating the sweep is issued, in steps S9 and S10.

The MCU 30 switches one of the output switching circuits 5a and 5b for a frequency band where the signal-input level signal has been detected to a connection state, thereby causing a received signal to be supplied as an audio output from the loudspeaker 7.

The illumination colors of the multi-colored light-emitting indicator indicating a single signal input status for each of the frequency bands and a simultaneous signal input status for both of the frequency bands are explained in a manual in advance. Alternatively, a one-to-one correspondence between the illumination colors and the frequency bands may also be indicated simply in a region adjacent to the position of the multi-colored light-emitting indicator 41.

Accordingly, an operator can intuitively see the signal input status of the multi-band receiver just by looking at the illumination color of the multi-colored light-emitting indicator 41.

Further, display described above is performed by a single indicator, so that the indicator can be disposed on the front surface of the housing of the handheld transceiver with sufficient free space allowed for, as illustrated in FIG. 2. Further, while the large area of the liquid crystal display section 32 being secured, a configuration maintaining desirable balance in view of a design as well can be realized.

Second Embodiment

This embodiment relates to the case where the above-mentioned multi-band receiver has a memory channel function. When the operator stores a frequency associated with a specific transmitting source in a memory included in the MCU 30 and can set a received frequency by a simple operation, the memory channel function causes the multi-colored light-emitting indicator to display whether a signal input at the memory channel frequency is present or not in the above-mentioned sweeping stage.

Figure 4:
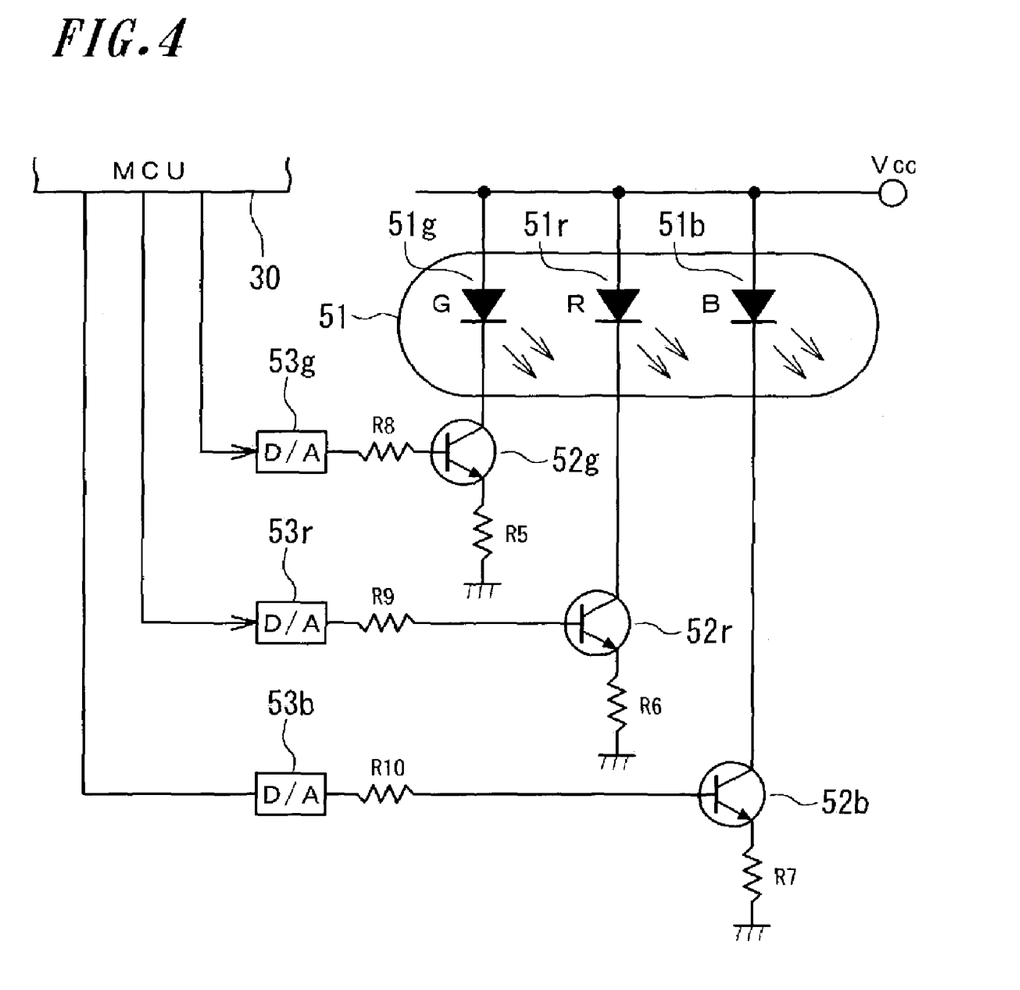
FIG. 4 is a circuit diagram of a multi-colored light-emitting indicator and drive circuits for the multi-colored light-emitting indicator according to a second embodiment.

The multi-colored light-emitting indicator and its drive circuits are constituted as illustrated in FIG. 4.

As a multi-colored light-emitting indicator 51, the indicator is employed where LEDs 51r, 51g, 51b associated with illumination colors consisting of three RGB colors, respectively are mounted on the single substrate thereof, and lights emitted by the LEDs 51r, 51g, and 51b are optically mixed, thereby allowing full-color display (in the case of 8-bit and 256 level control, about 16670 thousand colors, for example) can be displayed.

Drive circuits for the LEDs 51g, 51r, and 51b are constituted by NPN transistors 52g, 52r, and 52b, and D/A converters 53g, 53r, and 53b, respectively. Operating resistances R5, R6, and R7 and base input resistances R8, R9, and R10 are provided for the drive circuits for the LEDs 51g, 51r, and 51b, respectively.

Figure 5:
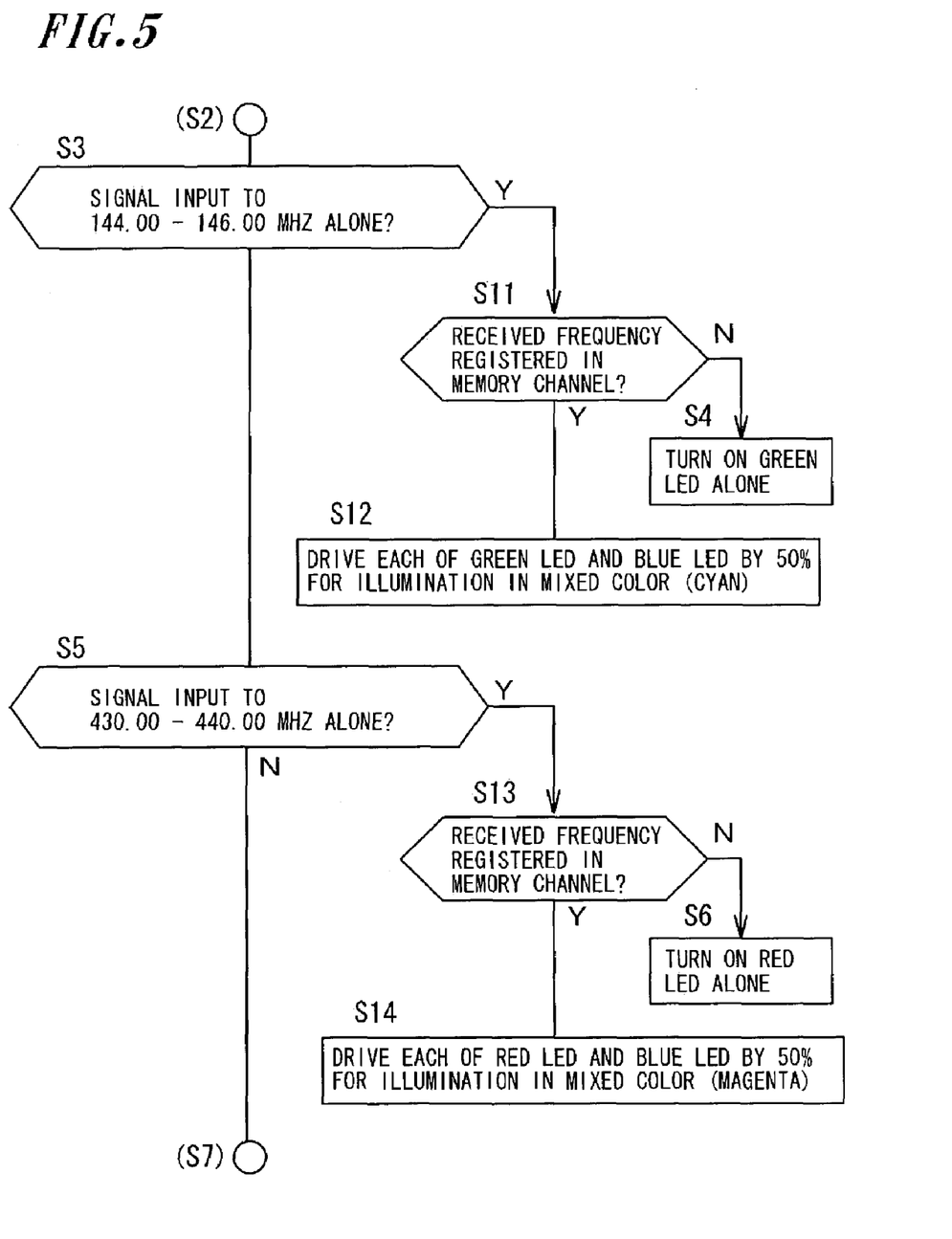
FIG. 5 is a flowchart showing a control procedure for display of a signal input status by the multi-colored light-emitting indicator in the second embodiment.

A procedure for displaying a signal input state according to this embodiment is shown in a flowchart in FIG. 5.

The procedure in this embodiment features control steps executed in the cases of steps S3 and S5 of the control procedure in FIG. 3 according to the first embodiment, where a single signal input status for each of the respective frequency bands has been detected. FIG. 5 shows only the control steps in this stage.

First, when a signal indicating a signal-input level equal to or more than a predetermined value has been detected in the frequency range from 144.00 to 146.00 MHz alone, the received frequency of the signal-input level signal is identified based on control data A1 and B1 for the variable bandpass filter 12 and the local oscillator circuit 17 during a sweep through the frequency band, and then the received frequency is compared with frequencies stored in advance in the memory channels, in steps S3 and S11.

Then, if it has been found that the received frequency is not the one stored in the memory channels as a result of comparison, only the green LED 51g of the multi-colored indicator 51 is turned on, as in the procedure according to the first embodiment, thereby displaying the state of a signal input to the frequency band associated with the LED 51g alone, in steps S11 and S4. On the contrary, if it has been found that the received frequency is the one stored in the memory, the green LED 51g and the blue LED 51b are driven by 50%, respectively, thereby causing the multi-colored light-emitting indicator 51 to turn on and illuminate in the mixture of green and blue (cyan), in steps S11 and S12.

The control procedure described above is also executed in a similar manner in the case where a signal indicating the signal input level equal to or more than the predetermined value has been detected in the frequency range from 430.00 to 440.00 MHz alone. In this case, the illumination color of the indicator is just different. In this case, however, the MCU 30 identifies the received frequency of the signal-input level signal based on sweeping control data A2 and B2 for the variable bandpass filter 12' and the local oscillator circuit 17' in the receiver circuit 4b for the 430 MH band.

If it has been found that the received frequency is not the one stored in one of the memory channels, only the red LED 51r is turned on, thereby just displaying the status of a signal input to the frequency band associated with the received frequency, in steps S13 and S6. If it has been found that the received frequency is the one stored in one of the memory channels, the red LED 51r and the blue LED 51b are driven by 50%, respectively, thereby causing the multi-colored light-emitting indicator 51 to illuminate in the mixture of red and blue (magenta), in steps S13 and S14.

Accordingly, the operator can intuitively see the status of a signal input to the 144 MHz band or 430 MHz band from a specific transmitting source when the multi-colored light-emitting indicator 51 is illuminated in the cyan or magenta color. Then, the operator can immediately set the received frequency to the frequency of the specific transmitting source, and thereby can obtain information received.

Incidentally, in this embodiment, even if the frequencies of signals input to both of the frequency bands coincide with the ones stored in the memory channels, the multi-colored light-emitting indicator 51 is illuminated yellow, as in the first embodiment. In this case, control to turn on the blue LED 51b alone may be executed alternatively, thereby causing the multi-colored light-emitting indicator 51 to illuminate blue. Still alternatively, control may also be performed to cause the multi-colored light-emitting indicator 51 to illuminate in a color clearly different from green, red, cyan, and magenta colors.

Third Embodiment

In the first embodiment, it can be seen which one of the 144 MHz band and the 430 MHz band the received frequency of a signal in the single signal input status falls within. However, it cannot be identified which level the input signal has in the bandwidth of the respective frequency bands, or the bandwidths of 2 MHz and 10 MHz.

In this embodiment, each frequency band is divided into a lot of frequency ranges in given steps, and the indicator is made to display in such a manner that which frequency range the received frequency of an input signal falls within can be identified.

A description will be directed to the case where the above-mentioned function is executed in the system circuit of the multi-band receiver in FIG. 1 by using the multi-colored light-emitting indicator and its drive circuits illustrated in FIG. 4, as in the second embodiment.

First, if an input signal in either of the 144 MHz band or the 430 MHz band has been detected by the detection signal C1 or C2 from the level detection circuit 18 or 18', the MCU 30 identifies the frequency of the received signal based on the control data A1, A2, B1, or B2 over the variable bandpass filters 12 or 12' and the local oscillator circuit 17 or 17' during a sweep, and then stores the frequency in the RAM included in the MCU 30.

On the other hand, frequency range data obtained by dividing the bandwidths of the respective frequency bands in predetermined steps is stored in the ROM included in the MCU 30.

The MCU 30 compares the received frequency saved in the RAM with each of the frequency range data in the ROM one after another to determine within which frequency range the received frequency falls. Then, based on the result of determination, the MCU performs drive control over the green LED 51g and the red LED 51r at predetermined rates.

Figure 6:
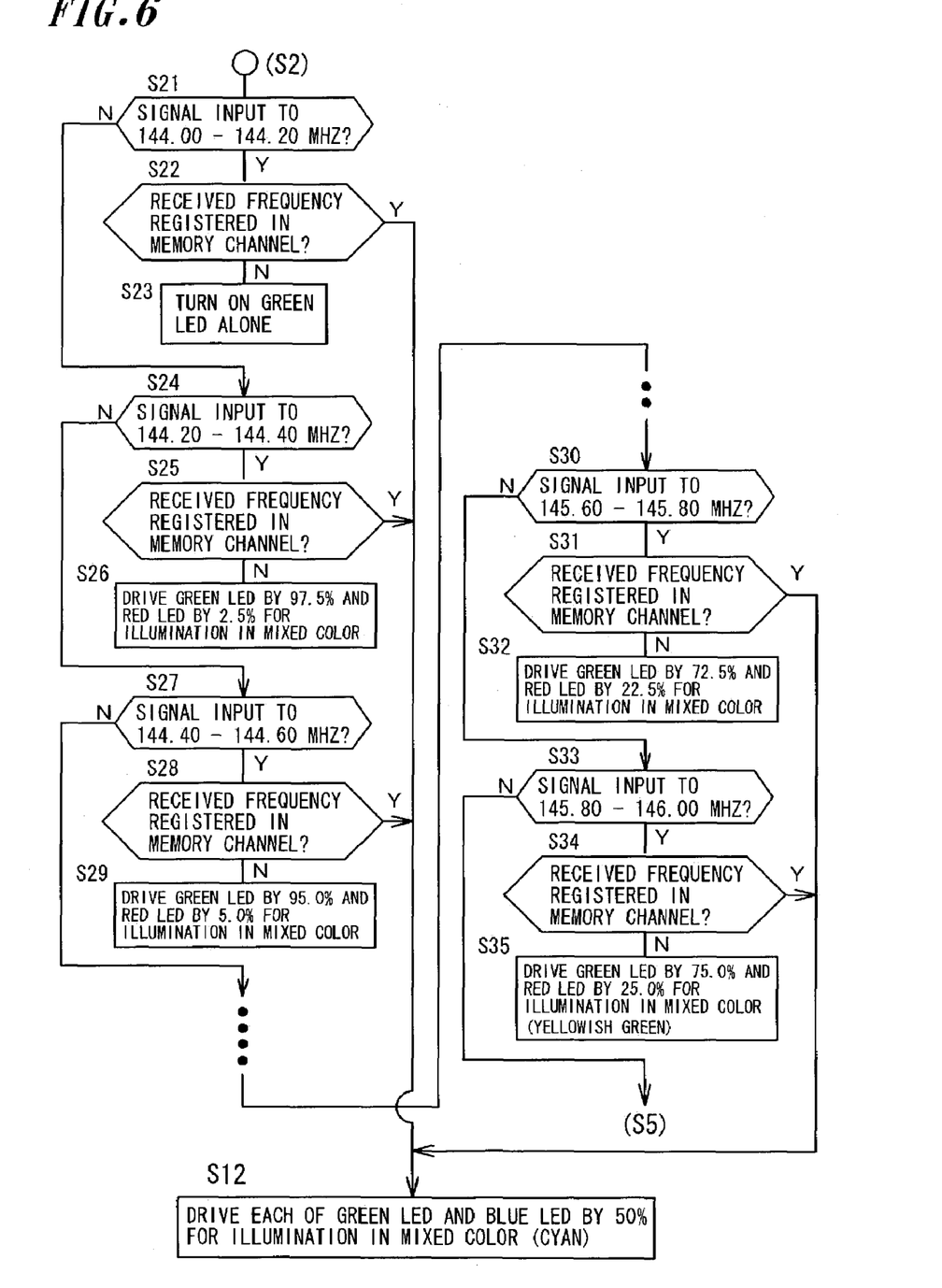
FIG. 6 is a flowchart showing a control procedure for display of a signal input status by a multi-colored light-emitting indicator according to a third embodiment.

When a single signal input to the 144 MHz band alone has been confirmed, for example, the MCU controls the light emission states of the LEDs 51g and 51r by an operating procedure as shown in a flowchart in FIG. 6. In this case, the frequency range bandwidth is set to be divided in steps of 200 KHz, thereby dividing the 144 MHz band in ten steps.

Specifically, if it has been found that the received frequency falls within the frequency range from 144.00 to 144.20 MHz as the result of determination, only the green LED 51g is turned on in steps S21, S22, and S23. In other words, only the green LED 51g is driven by 100%, thereby causing the multi-colored light-emitting indicator 51 to illuminate green.

Next, if it has been found that the received frequency falls within the frequency range from 144.20 to 144.40 MHz, the green LED 51g is driven by 97.5%, and the red LED 51r is driven by 2.5%, thereby causing the multi-colored light-emitting indicator 51 to illuminate in a color obtained by mixing the green and red colors at the respective drive rates in steps S24, S25, and S26.

As it has been found that the received frequency falls within the frequency range from 144.40 to 144.60 MHz, from 144.60 to 144.80 MHz, . . . from 145.60 to 144.80 MHz, or from 145.80 to 146.00 MHz as the result of determination, which is the higher frequency range, the drive rate of the green LED 51g is set to be decremented in steps of 2.5%, and the drive rate of the red LED 51r is set to be vice versa or to be incremented in steps of 2.5%, in steps S27 to S35.

Accordingly, as the received frequency of an input signal increases, the multi-colored light-emitting indicator 51 is made to illuminate in a color obtained by mixing the green and red colors, which gradually changes from green to yellow. The illumination color of the multi-colored light-emitting indicator 51 obtained by this mixture becomes almost yellowish green in the highest frequency range from 145.80 to 146.00 MHz set in the 144 MHz band.

Figure 7:
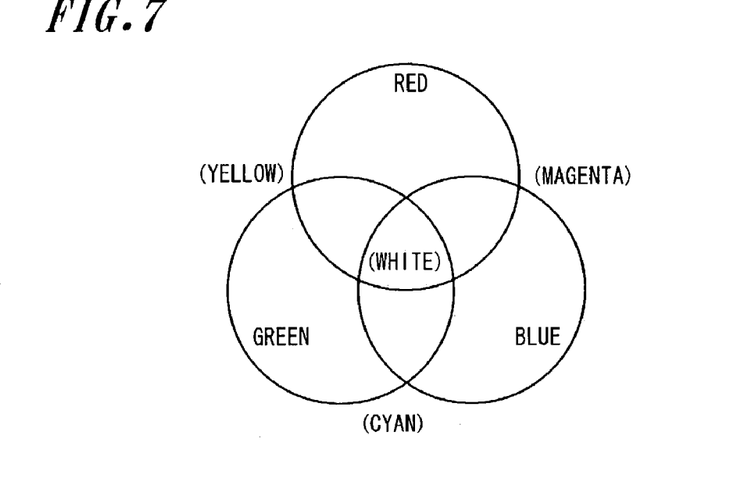
FIG. 7 is a diagram showing an additive process of three primary colors of light.

It means that the illumination color of the multi-colored light-emitting indicator 51 gradually changes from red to yellow in a diagram in FIG. 7, which shows an additive process of three primary colors of light.

The above-described gradual drive control in increments and decrements of 2.5% is performed because if drive control in increments and decrements of 5% is performed, the illumination color of the multi-colored light-emitting indicator 51 obtained by mixing the red and green colors becomes yellow in the frequency range from 145.80 to 146.00 MHz, which is identical to the illumination color of yellow indicating the simultaneous signal input status in both of the 144 MHz band and the 430 MHz band. Thus, there is a need to make the change in the illumination color to be limited to yellowish green, thereby securing a illumination color difference between the single signal input status and the simultaneous signal input status.

The flowchart in FIG. 6 relates to the gradual drive control over the single signal input to the 144 MHz band alone. In the case of the single signal input to the 430 MHz band as well, the illumination color of the multi-colored light-emitting indicator is changed step by step by a procedure similar to the procedure shown in the flowchart in FIG. 6.

In this case, however, the bandwidth of this frequency band is 10 MHz. Thus, if the frequency band is divided into 10 stages as in the case of the 144 MHz band, the bandwidth is set to be divided in steps of 1 MHz. Then, respective divided frequency ranges from 430.00 to 431.00 MHz, from 431.00 to 432.00 MHz, from 432.00 to 433.00 MHz, . . . and from 439.00 to 440.00 MHz are set.

Further, in this case, corresponding to the respective frequency ranges, the drive rate of the red LED 51r is set to be decremented in steps of 2.5%, and the drive rate of the green LED 51g is set to be incremented in steps of 2.5%. This drive rate relationship is the inverse of the relationship in the case of the 144 MHz band.

Then, according to the gradual control, the illumination color of the multi-colored light-emitting indicator 51 gradually changes from red to yellow. The illumination color obtained by mixing the red and green colors becomes almost orange in the highest frequency range from 439.00 to 440.00 MHz.

Therefore, according to this embodiment, the operator can see the single signal input status to each of the frequency bands as in the first embodiment. Further, the operator can readily identify at which level the received frequency of an input signal is in each of the frequency bands.

The number of division stages for the respective bandwidths is arbitrary, and according to the number of division stages, increment and decrement of the drive rates of the LEDs 51r and 51g should be adjusted.

In this embodiment, the drive rates of the red LED 51r and the green LED 51g are controlled. In the multi-colored light-emitting indicator 51 that includes the LEDs 51r, 51g, and 51b of three primary colors, display in nearly full color is possible. Thus, if the blue LED 51b is also used, gradual changes in the illumination color of the indicator in other color group can also be performed.

What is claimed is:

1. A signal-input status display device for a multi-band receiver, said multi-band receiver comprising:
   an indicator having a plurality of light-emitting diodes (hereinafter referred to as "LEDs") emitting different illumination colors as light source elements, for optically mixing individual lights of said respective LEDs, thereby permitting multi-colored light emission;
   signal detection means for detecting from receiving circuits for respective frequency bands signals each indicating a signal-input level of a received wave;
   determination and identification means for determining whether a single signal input to one of the frequency bands has been performed or simultaneous signal inputs to a plurality of the frequency bands have been performed, based on states of the signals each indicating the signal-input level, detected by the signal detection means, and identifying said one of the frequency bands to which the single signal input has been performed; and
   LED control means for performing drive control over said respective LEDs such that an illumination color of said indicator differs according to each of the frequency bands based on information on said one of the frequency bands to which the single signal input has been performed if said determination and identification means has determined the single signal input has been performed, or such that the illumination color of said indicator is different from the colors emitted in a status of the single signal input if said determination and identification means has determined the simultaneous signal inputs have been performed.

2. The signal-input status display device for the multi-band receiver according to claim 1, wherein when said multi-band receiver has a multi-channel function for storing a frequency associated with a specific transmitting source, said multi-band receiver further comprises comparison means for comparing a received frequency in the single signal input status with the frequency stored by said memory channel function, and
   wherein when said comparison means has detected coincidence between the frequencies, said LED control means performs drive control over said respective LEDs such that the illumination color of said indicator is different from the colors emitted in the single signal input status and a status of the simultaneous signal inputs.

3. The signal-input status display device for the multi-band receiver according to claim 1, wherein said multi-band receiver further comprises determination means for determining within which frequency range a received frequency in the single signal input status falls among a plurality of frequency ranges obtained by division of the respective frequency bands in predetermined steps,
   wherein said LED control means performs drive control over said respective LEDs such that the illumination color of said indicator is sequentially changed within an identical color group for each of the frequency ranges in ascending or descending order of frequencies, and
   wherein said indicator is caused to illuminate in a color associated with a frequency range determined by said determination means.

* * * * *